United States Patent [19]
Harjes et al.

[11] 3,974,033
[45] Aug. 10, 1976

[54] MALTO-DEXTRINS OF IMPROVED STABILITY PREPARED BY ENZYMATIC HYDROLYSIS OF OXIDIZED STARCH

[75] Inventors: Clarence F. Harjes, Hinsdale; Vilas L. Wermers, Lemont, both of Ill.

[73] Assignee: CPC International Inc., Englewood Cliffs, N.J.

[22] Filed: Sept. 12, 1975

[21] Appl. No.: 612,988

[52] U.S. Cl. .............................. 195/31 R; 195/30; 426/48; 426/658; 426/661
[51] Int. Cl.$^2$ ........................................ C12D 13/02
[58] Field of Search ................. 195/31 R, 11, 7, 30; 426/48, 661, 658; 260/233.3 R; 127/29, 70

[56] References Cited
UNITED STATES PATENTS

| | | | |
|---|---|---|---|
| 2,916,405 | 12/1959 | Evans et al. | 426/661 |
| 3,354,046 | 11/1967 | MacAllister et al. | 195/7 |
| 3,616,219 | 10/1971 | Massey | 195/31 R |
| 3,663,369 | 5/1972 | Morehouse et al. | 195/31 R |
| 3,709,788 | 1/1973 | Best et al. | 195/31 R |

OTHER PUBLICATIONS

Parrish et al., "Actions of Starch Carbohydrates on Chemically Modified Maltodextrins," *Arch Biochem. and Biophys.*, vol. 137, pp. 185–189 (1970).

*Primary Examiner*—A. Louis Monacell
*Assistant Examiner*—Thomas G. Wiseman
*Attorney, Agent, or Firm*—Albert P. Halluin

[57] ABSTRACT

There is disclosed malto-dextrins having a D.E. not substantially above about 20, prepared by the enzymatic hydrolysis of oxidized starch. Syrups of the malto-dextrins are capable of remaining haze-free for long periods of time at high solids concentrations. The malto-dextrins are prepared by first liquefying a highly oxidized starch with an acid or an enzyme to a D.E. not substantially above about 7, and in a subsequent step, converting the oxidized and liquefied starch with a bacterial alpha-amylase enzyme preparation to achieve a malto-dextrin product having a D.E. not substantially above about 20.

17 Claims, No Drawings

MALTO-DEXTRINS OF IMPROVED STABILITY PREPARED BY ENZYMATIC HYDROLYSIS OF OXIDIZED STARCH

BACKGROUND OF THE INVENTION

1. Field Of The Invention

This invention relates to malto-dextrins syrups which remain clear over a relatively long period of time at high solids concentrations. The syrups are particularly useful as extenders for synthetic sweeteners. The invention is also concerned with a method of preparing said syrups wherein the first step includes oxidizing the starch prior to liquefaction with an acid or an enzyme and conversion with an enzyme.

2. Description Of The Prior Art

There are many processes known in the art for producing starch hydrolysates. These processes include liquefying an aqueous slurry of starch with an acid, followed by enzymatic conversion, sometimes referred to as saccharification, or liquefying an aqueous slurry of starch with a liquefying enzyme, followed by enzymatic conversion. For example, Dutch Patent Publication No. 66/12486, published Apr. 3, 1967, discloses a method for hydrolyzing an aqueous slurry of starch with an acid to a D.E. of at least about 7 to no more than about 16, followed by enzymatic conversion with bacterial alpha-amylase to a D.E. in the range of from about 23 to about 35. Products produced by this technique are referred to by the corn wet milling industry as "corn syrup solids" or "glucose solids".

Another known class of starch hydrolysates are referred to by the corn wet milling industry as "malto-dextrins" or "hydrolyzed cereal solids". Malto-dextrins are starch hydrolysates having a measurable dextrose equivalent value not substantially above about 20 and containing a relatively small amount of dextrose and maltose. Generally, the dextrose content of malto-dextrins is less than about 2.4%, by weight and the amount of maltose is less than about 9%, by weight.

Malto-dextrins are commercially available under the trademarks, Mor-Rex, manufactured and sold by Corn Products, a Unit of CPC International Inc., International Plaza, Englewood Cliffs, N.J.; Maltrin, manufactured and sold by Grain Processing Corporation; Frodex, manufactured and sold by American Maize Products Company; and Star-Dri 15, manufactured and sold by A. E. Staley Manufacturing Company.

Many commercially available malto-dextrins are generally prepared by first liquefying native starch with an acid or an enzyme to a D.E. less than about 15, followed by an enzymatic conversion to the final desired D.E. Products produced by these methods are extremely soluble in water and their concentrated syrups are haze resistant at low temperatures for at least three days. One specific method for preparing these unique malto-dextrins is disclosed and claimed in U.S. Pat. No. 3,560,343 and its reissue application Ser. No. 327,335, filed Jan. 29, 1973. This patent and reissue application disclose and claim a process whereby an aqueous slurry of starch is first solubilized with an acid at elevated temperatures to a D.E. less than about 15, followed by enzymatic conversion with a bacterial alpha-amylase enzyme preparation to increase the D.E. by at least 5 to obtain a product having a D.E. of 10 to 25.

U.S. Pat. No. 3,849,194, granted Nov. 19, 1974, discloses and claims a process for preparing waxy starch based malto-dextrins wherein a slurry of waxy starch is liquefied with an enzyme and thereafter converted to the desired D.E. by the action of a bacterial alpha-amylase enzyme preparation. U.S. Pat. No. 3,853,706, granted Dec. 10, 1974, discloses and claims a process for preparing malto-dextrins derived from non-waxy starches by first liquefying and solubilizing non-waxy starch in an aqueous slurry with an enzyme, heating the slurry to a temperature above about 95°C. and thereafter converting the heat-treated slurry with a bacterial alpha-amylase enzyme preparation to obtain the desired product. German Patent Publication No. 1,955,392, published June 16, 1971, and British Patent Specification No. 1,274,506, which generally correspond to U.S. Pat. No. 3,663,369, also disclose a process for preparing malto-dextrins, wherein an aqueous slurry of starch is liquefied with an acid or an enzyme to a D.E. not substantially above about 3, followed by enzymatic conversion with a bacterial alpha-amylase enzyme preparation to obtain a malto-dextrin having a D.E. not substantially above about 18.

The aforementioned prior art methods provide malto-dextrins products which perform well in many applications, particularly when used as a carrier for synthetic sweeteners. Other applications for the malto-dextrins include use as a bulking or dispersing agent in synthetic creams or coffee whiteners, as a moisture-holding agent in breads, pastries, meats and as a bodying and smoothing agent in puddings, soups, and frozen ice desserts.

The malto-dextrins of the aforementioned prior art methods are first prepared in syrup form and then generally dried to a solid. However, many users of malto-dextrins desire a liquid product to reduce handling costs and to eliminate the need for redispersing a dried product. It has been found that one cannot store and/or ship malto-dextrins of the desired low D.E. in highly concentrated form. To date, there is no known economical method for preparing a malto-dextrin syrup at high solids which is resistant to the formation of haze on storage. The malto-dextrins prepared by the aforementioned prior art methods tend to haze when their syrups are in concentrated form, due to the association of the partially degraded starch molecules in the solution. For example, malto-dextrins from corn starch having a D.E. less than about 20 when concentrated up to about 70% solids tend to quickly haze upon storage, until the point where the product sets up to a solid. Attempts to produce waxy malto-dextrin products at about a 70% solids content or above and having a D.E. less than about 15, result in hazing when the syrup is stored for long periods of time, i.e., more than about 3 days.

It has been disclosed in U.S. Pat. Nos. 3,616,219 and 3,709,788, that bleached starches can be treated with bacterial alpha-amylase enzyme preparations. These products are useful as adhesives and coatings in the manufacture of paper and textile products.

Bleached starches are starches produced by an oxidative treatment which leads to a marked whitening of the starch. Generally, the severity of the oxidative treatment is controlled so that the carotene, xanthophyll and related pigments naturally occurring in the starch are efficiently oxidized to colorless compounds while the starch product is only slightly oxidized (D.S. ≦ 0.1 as later defined) if at all. Bleaching may be carried out either in a dry state or in solution and a wide variety of oxidizing agents may be employed, the only restrictive requirement being that the oxidizer chosen must be mild enough under the chosen reaction conditions so that the starch will not be excessively attacked and the oxidizer must be strong enough so that the pigments will be effectively oxidized. Examples of usable bleaching agents include, but are not limited to, chlorine, bromine, hypochlorite, permanganate, ozone, chlorites, and chlorites in combination with persulfates. Methods of bleaching starch are discussed in more detail in "Chemistry and Industry of Starch", second edition, R. W. Kerr, editor, Academic Press, Inc., New York, N. Y. (1950).

Oxidized starches are starches produced from the oxidative treatment of the starch which leads to chemical changes in the starch. For example, oxidation of primary alcohol groups to carboxyl groups, of aldehyde groups to carboxyl groups, of secondary alcohol groups to ketone groups, and of glycol groups to carboxyl groups. The oxidation of starch leads to a starch product which is more easily solubilized and which exhibits a lower viscosity when solubilized in water. Oxidation may be carried out by utilizing any number of oxidizing agents. Often the oxidizing agents used to form oxidized starch are the same agents that are used to bleach starch. Harsher reaction conditions such as higher temperatures, longer contact times, different pH, etc., are used to cause these agents to react with the starch molecules rather than just the carotene, etc. Reagents used in the oxidation of starch include, but are not limited to, air, bleaching powder, halogens, chloramines, chloric acid, chlorates, chromic acid, ferric chloride, hydrogen peroxide, hypochlorite, manganese dioxide, nitric acid, nitrogen dioxide, perborates, periodic acid, persulfates, potassium dioxide, potassium permanganate, silver oxide, p-toluene sulfochloramide and zinc oxide. Methods of oxidizing starch are also disclosed in more detail in the previously cited text, "Chemistry and Industry of Starch".

The repeating anhydroglucose units in starch may have different degrees of substitution (D.S.), i.e., from one to three, and starch derivatives are generally categorized in terms of their D.S. In a given quantity of a starch derivative, there will generally be some anhydroglucose units that are not substituted at all (i.e., D.S.,O), together with other anhydroglucose units that have different degrees of substitution, from 1 to 3. A statistical average is employed to characterize the average D.S. of the entire quantity, although the figure is ordinarily stated as the D.S. rather than the average D.S. The oxidized starch treated according to this invention may have a value within a range of D.S. (carboxyl substitution) which may be as little as 0.0001, up to the maximum level of 3.0. Irrespective of the number of molecules of starch which are reacted, or the actual sequence of substitution, or the number of anhydroglucose units involved, the general formula is intended to represent products where the substitution may occur to various degrees of substitution at all or less than all anhydroglucose units in all or less than all starch molecules.

The distinction between oxidized and bleached starches is now well known to those skilled in the art, particularly the corn wet milling industry. Such a distinction is described in U.S. Pat. No. 3,598,622, the disclosure of which is incorporated herein by reference.

In view of the difficulty incurred by the prior art in producing haze free starch hydrolysates from untreated starch and the inability to provide haze-free, malto-dextrins from bleached starches, the art has not attempted to produce malto-dextrins from oxidized starch.

OBJECTS OF THE INVENTION

It is accordingly an object of the present invention to provide a process for the enzymatic hydrolysis of oxidized starches to haze-free malto-dextrin products.

It is a more specific object of the present invention to provide a process for the conversion of oxidized starches to malto-dextrin products which can be concentrated to high solids content syrups which are resistant to haze formation.

SUMMARY OF THE INVENTION

The present invention provides malto-dextrins having a D.E. not substantially above 20 and preferably within the range of about 8–20, prepared by the enzymatic conversion of oxidized starch. The malto-dextrins of the present invention are further characterized by having a relatively narrow distribution of their polysaccharides.

The malto-dextrins of the present invention can be refined to produce syrups which remain haze free for long periods of time, even at high solids concentrations of the order of 70–80% d.b. They are capable of being dissolved in water to a solids content as high as 80% by weight to obtain syrups which exhibit remarkable solution stability, and remain haze free, as compared to prior art low D.E. starch hydrolysate syrups. Syrups produced from the malto-dextrins of the present invention may be stored and shipped in highly concentrated form without risk of haze formation or without the risk of syrup setting up to a solid or semi-solid state.

Syrups from malto-dextrins of the present invention can have solids contents ranging from 50–80%, or higher, and most frequently 50–75% by weight. Such concentrated syrups may, if desired, be spray dried and later reconstituted to a highly concentrated syrup which is resistant to haze formation since the malto-dextrins of the present invention, in dry form, are totally water soluble.

Malto-dextrins of the present invention are prepared by first liquefying a highly oxidized starch with either an acid or an enzyme to a measurable dextrose equivalent value (D.E.) not substantially above about 7. In a subsequent step, the liquefied, oxidized starch is subjected to enzymatic conversion with a saccharification enzyme, preferably an alpha-amylase enzyme preparation to produce a malto-dextrin having a D.E. not substantially above 20, and preferably within the range of about 8 to 20.

DESCRIPTION OF THE PREFERRED EMBODIMENT

The malto-dextrins of the present invention exhibit solution stability and remain haze free over extended period of time, even at high solids contents. They normally have a D.E. not substantially above 20, and preferably a D.E. within the range of 8 to 20. A typical malto-dextrin of the present invention generally has a D.E. within the range of about 8 to about 14.

The term "measurable dextrose equivalent value" (D.E.) referred to herein, is defined as the reducing value of the malto-dextrin (hydrolysate) material compared to the reducing value of an equal weight of dextrose, expressed as percent, dry basis, as measured by the Schoorl method described in *Encyclopedia of Industrial Chemical Analysis*, Vol. 11, pp. 41–42, i.e., $$D.E. = \frac{\text{Reducing Value of Hydrolysate Material}}{\text{Reducing Value of Dextrose}} \times 100$$

In the above equation, an equal weight of each dextrose and the hydrolysate material are involved. The term dextrose equivalent value of a starch hydrolysate is a common expression in the art for describing the total reducing sugars content of a material calculated as dextrose and expressed as percent, dry basis.

The malto-dextrins of the present invention have a relatively narrow saccharide distribution. In general, the amount of the dextrose or monosaccharide is less than 1.4% by weight, the amount of the maltose present is less than 9% by weight and the amount of the maltotriose is less than 11% by weight. The malto-dextrins of the present invention remain haze free at solids concentrations of about 70%, by weight, dry basis, for periods of more than 60 days when the D.E. is within the range of 8 to 14.

As indicated hereinabove, oxidized starches are used in the preparation of the malto-dextrins of this invention. In the preferred practice of this invention, the oxidized starches are those prepared by oxidation with a hypochlorite, and preferably an alkali metal or alkaline earth metal hypochlorite. However, other well-known reagents for the oxidation of starches such as those discussed above may be used in the production of oxidized starches.

The relative amount of the oxidant used in the oxidation of the starch is not critical, although it is generally preferred that the oxidized starches employed in the practice of this invention be highly oxidized starches. In the use of the preferred halogen-containing oxidizing agents described above, the level of the oxidant in the starch is expressed on the basis of the halogen content of the oxidizing agent. For example, the most preferred oxidizing agent, sodium hypochlorite, is used in an amount expressed as chlorine content of the starch on a dry basis (d.b.).

In the practice of this invention, it has been found that the oxidant level is preferably at least 1%, calculated as halogen on a dry basis. The use of oxidant levels below 1% can, in some cases, result in high paste viscosities and low filtration rates in the final product. In general, it is preferred to employ an oxidant level within the range of 1 to 15% by weight, and preferably 1 to 8% by weight on a dry solids basis, with the amount of the oxidizing agent being expressed in terms of its available halogen content.

The effect of most oxidizing agents is primarily a depolymerization effect, and best results are usually obtained when the pH of the starch undergoing oxidation is maintained within the range of 5 to 8, and most preferably 6 to 7.5. In carrying out the oxidation reaction, the starch is suspended in water to form a slurry having a dry solids content ranging from 10 to 50% by weight, and preferably 25 to 45% by weight. The oxidizing agent is added to the slurry, and the slurry is maintained at a reactive temperature, i.e., generally within the range from about 30° to about 60°C, and preferably within the range from about 35° to about 45°C.

The resulting oxidized starch generally has a Scott viscosity (100 g.) within the range of 35 to 70 and a pH ranging from 6 to 9. Such oxidized starches have a minimum carboxyl value of at least 0.1, and preferably 0.2 to 1.5.

The oxidized starch can be thinned or liquefied by use of either an acid or an enzyme. The solids content of the oxidized starch slurry to be liquefied and enzymatically converted should be within the range from about 5 to about 40%, and preferably in the range from about 15 to about 35%, by weight. Lesser concentrations can, of course, be used, and in general as the concentration is decreased, the ease with which the conversion mixture may be handled is increased. As a practical matter, however, it is highly desirable in most instances to use smaller volumes, i.e., higher concentrations of starch. This avoids or at least diminishes the considerable expense of concentrating the conversion mixture at the conclusion of the process.

Acid thinning or liquefaction of starches is well known to those skilled in the art and is described in U.S. Pat. No. 3,560,343 and its Reissue Application Ser. No. 327,335. In general, the acid liquefaction step is carried out at a pH less than 5, and preferably at a pH within the range of 1 to 4 at a temperature sufficient to gelatinize or solubilize the starch. The liquefaction can be conducted by the use of any suitable equipment, e.g., a jet cooker or any other means for rapidly liquefying the starch slurry. Hydrolysis of the starch occurs concomitantly with the liquefaction so as to produce an acid hydrolysate having a dextrose equivalent value (D.E.) not substantially above about 7 and preferably within the range from about 1 to about 6.

Any of the acids conventionally used in the acid hydrolysis of starch may be used in the acid thinning or liquefaction step of this invention. For example, organic or inorganic acids may be used. Hydrochloric acid is preferred.

The temperature of the acid liquefaction of the starch can vary, depending upon the concentration of the starch in the slurry, the concentration of the acid, etc., as well known to those skilled in the art. Preferably, the temperature of the acid liquefaction will be in the range from about 60° to about 150°C, and more preferably a temperature in the range from about 95° to about 110°C should be employed.

When enzymatic liquefaction is employed in the practice of this invention, the enzymatic liquefaction is carried out in the presence of a starch-liquefying hydrolytic enzyme, and preferably an alpha-amylase derived from bacterial sources as described in detail hereinbelow.

Enzymatic liquefaction is preferably carried out as a pH ranging from about 5.0 to about 9.0, although higher or lower pH's can be used. In general, the pH range of 6.0 to 8.0 is suitable for optimum activity of the bacterial alpha-amylase.

The enzymatic liquefaction of the oxidized starch is preferably carried out at a temperature above 80°C and preferably a temperature within the range from about 80° to about 105°C. Preferably the enzymatic liquefaction is conducted at a temperature in the range from about 85° to about 95°C. Higher temperatures can sometimes be used, depending somewhat upon the thermal stability of the enzyme, if enzymatic liquefaction is to be effected.

The liquefaction step is carried out to liquefy and hydrolyze the starch and to insure that the starch hydrolysate thus produced has been gelantinized and is substantially free of residual starch granules.

After the liquefaction step has been substantially completed, the liquefied and partially hydrolyzed, oxidized starch is then treated with a saccharifying or dextrinizing enzyme, preferably to increase the D.E. by at least 2 and more preferably to increase the D.E. by at least about 5, and to produce a final hydrolysate having a D.E. not substantially above 20 and preferably within the range of about 8 to 20.

The enzyme used for enzymatic conversion of the oxidized starch is an alpha-amylase, and preferably an alpha-amylase of the type described below. The pH of the conversion medium is generally maintained for the optimum activity of the bacterial alpha-amylase, which is preferably within the range of a pH between about 5.0 and about 9.0. It has been found, however, that best results are usually obtained when the enzymatic conversion reaction is carried out at a temperature which is at least about 60°C. When converting an enzyme-thinned oxidized starch, it is generally preferred that the enzymatic conversion be carried out at a temperature lower than the temperature of the enzymatic liquefaction. In general, enzymatic conversion is carried out at a temperature below 85°C but at least about 60°C.

The enzyme used for enzymatic liquefaction and conversion of the oxidized starch is an alpha-amylase and preferably a bacterial alpha-amylase. Suitable bacterial alpha-amylases can be derived from strains of *Bacillus subtilis*, *Bacillus mesentericus*, *Bacillus coagulans*, *Bacillus amyloliquefaciens*, and *Bacillus licheniformis*. Especially suitable alpha-amylases are those derived from *Bacillus licheniformis* and *Bacillus subtilus*. Particularly preferred are those derived from *Bacillus licheniformis* such as those derived from a strain of *Bacillus licheniformis* organism selected from the group consisting of NCIB 8059, NCIB 8061, ATCC 6598, ATCC 6634, ATCC 8480, ATCC 9545A, and ATCC 11945. The preparation of enzymes from *Bacillus licheniformis* organisms is described in Austrian patent publication No. 4836/70, German patent publication No. 2,025,748, and British patent specification No. 1,296,839, the disclosure of which is incorporated herein by reference. These alpha-amylase enzyme preparations are commercially available under the tradename "Thermamyl", "Thermamyl 60" and "Thermamyl 120" from Novo Terapeutisk Laboratorium, Copenhagen, Denmark.

Other commercially available alpha-amylases which may be used in the practice of the present invention include "Takamine HT-1000" and "Tenase" (available from Miles Laboratories, Inc.), "Dex-Lo MM" and "CPR-8" (available from Wallerstein Division of Baxter Laboratories), "Kleinstase GM-16" and "Kleistase L-1" (available from Daiwa Kasai), and "Rapidase SP-250" (available from Societe "Rapidase" France).

The amount of alpha-amylase to be used in the liquefaction and conversion steps of the process will generally be in the range from about 0.1 to about 25 units per gram of starch (dry basis).

The alpha-amylase activity of an enzyme is determined as follows:

The enzyme is allowed to react with a standard starch solution under controlled conditions. Enzyme activity is determined by the extent of starch hydrolysis, as reflected by a decrease in iodine-staining capacity, which is measured spectrophotometically. The unit of bacterial alpha-amylase activity is the amount of enzyme required to hydrolyze 10 mg. of starch per minute under the conditions of the procedure. The method is applicable to bacterial alpha-amylases, including industrial preparations, except materials which possess significant saccharifying activity.

From 0.3 to 0.5 gram of solid sample or from 0.3 to 1.0 ml. of a liquid sample is dissolved in a sufficient quantity of 0.0025 M. aqueous calcium chloride to give an enzyme solution containing approximately 0.25 unit of activity per ml.

A mixture of 10 ml. of 1% Lintner starch solution, equilibrated to 60°C and 1 ml. of the enzyme sample to be tested is mixed and held in a constant temperature bath at 60°C. for exactly 10 minutes, a 1-ml. sample is removed and added to a mixture of 1 ml. of 1 M aqueous hydrochloric acid and about 50 ml. of distilled water. The iodine-staining capacity of such acidified sample then is determined by adding 3.0 ml. of 0.05% aqueous iodine solution, diluting to 100 ml. with distilled water, and mixing well. The absorbance of the solution, relative to that of distilled water, is measured at 620 nm, in a 2-cm cell.

A similar measurement is made of the standard starch solution (to which water is added instead of the enzyme solution) to provide a blank absorbance.

The enzyme activity, in units/gram or/ml. is equal to $$\frac{(\text{Blank Absorbance} - \text{Sample Absorbance}) \times \text{Dilution Factor} \times 50}{\text{Blank Absorbance} \times 10 \times 10}$$

The amount of bacterial alpha-amylase to be used ranges from about 0.1 to about 25 units per gram of starch (dry basis). The use of larger amounts provides no practical advantage; the increased starch solubilization which results from the use of more than 25 units per gram does not justify the additional cost of enzyme. The optimum quantity of alpha-amylase depends upon the quantity of of saccharifying enzyme, and vice versa. A preferred range of concentration of alpha-amylase is from about 1.0 to about 10 units per gram of starch (dry basis).

After the second step, enzymatic conversion can be stopped by adjusting the pH of the hydrolyzed, oxidized starch to a pH of 4.5 or below, or, alternatively, by heating the conversion mixture to a temperature above the inactivation temperature of the enzyme. After termination of the enzymatic conversion, the starch hydrolysate has a solids content of less than 50%. It may be used in an unaltered or refined form as desired. It is sometimes preferred to concentrate the starch hydrolysate to form a syrup having a solids content greater than 50% as described above. Such refining operations are, however, conventional and include treatment with vegetable carbon, ion exchange resins, filtration, centrifugation and the like, as desired, to place the hydrolysate in the desired form for shipment and/or storage or use.

In accordance with one preferred embodiment of the invention in which use is made of enzymatic liquefaction, it has been found that heating the liquefied hydrolysate insures the completion of the liquefaction of the oxidized starch and thus provides a final hydrolysate having improved filtration characteristics. It is generally preferred, when using such intermediate heating steps, to heat the liquefied hydrolysate to a temperature preferably within the range from about 95° to about 180°C. Such heating steps consequently will generally inactivate the enzyme and will require the addition of more enzyme in the enzymatic conversion step.

The process of the present invention is applicable to a wide variety of starchy materials, including cereal starches, waxy starches and/or root starches. Typical of such starches are the non-waxy cereal starches, such as corn starch and wheat starch; potato starch, tapioca starch; grain sorghum starch; rice starch, etc.; waxy starches such as waxy milo starch and waxy maize starch and the like. The invention is also applicable to corn grits and other raw materials high in starch content.

The present invention having been described in detail, the following specific examples are provided to illustrate additional embodiments of the process and product thereof. It is to be understood that the examples are given for illustrative purposes only and not by way of limitation.

EXAMPLE 1

This example illustrates the hydrolysis of oxidized corn starch in an enzyme-enzyme process.

The oxidized corn starch employed is identified as "CLARO" Code 5592 oxidized corn starch (an oxidized starch commercially available from CPC International Inc., Englewood Cliffs, N.J.). This starch is prepared by subjecting a starch slurry at 22°–23° Be to the action of 4.2 to 4.7% chlorine (dry basis) in the form of sodium hypochlorite at a temperature of about 38°–43°C. The oxidized starch has a Scott viscosity of 100/44 g/sec and a minimum carboxyl value of 0.73. After the oxidation reaction, the oxidized starch is neutralized with 66° Be $H_2SO_4$ to a pH of 6.0 to 6.2 and 0.4% (d.b.) sodium bisulfite is added to destroy residual chlorine.

A starch slurry of the above described Code 5592 oxidized corn starch is formulated by bringing 10,811 g of the oxidized starch (dry solids basis) to a total volume of 27 liters in water, which corresponds to 19.5°Be. The pH of the slurry is about 4.5, and is adjusted to 8.0 with NaOH. To this slurry there is added 0.06% by weight (d.b.) of bacterial alpha-amylase (HT 1000 from Miles Laboratories) for liquefaction of the oxidized starch. During the liquefaction step, the oxidized starch is maintained at a temperature of about 90°C. After about 1 hour, the starch is liquefied and the pH has dropped to 5.9; the dextrose equivalent value (D.E.) of the liquefied starch is 4.3.

The pH of the liquefied starch is then adjusted to 6.5 with NaOH, and the temperature is adjusted to 60°C. The liquefied starch dispersion is placed in several conversion beakers for further treatment. Samples (1) to (3), (7) to (9) and (13) of the liquefied starch are then dosed with additional quantities of the enzyme (HT-1000), and subjected to conversion or saccharification at 60° or 80°C for 24 hours. Samples (4) to (6) and (10) to (12) are heated to a temperature of 110°C, sufficient to inactivate the enzyme, and dosed with additional quantities of enzyme (HT-1000) for conversion or saccharification at 60° or 80°C.

The results of the conversion steps are summarized below:

Table 1

| Sample No. | Conversion Temp.°C | % HT-1000 (d.b.) | %d.s. of filtrate | Final D.E. |
|---|---|---|---|---|
| (1) | 60° | 0.001 | 25.9 | 14.2 |
| (2) | 60° | 0.002 | 25.9 | 15.6 |

Table 1-continued

| Sample No. | Conversion Temp.°C | % HT-1000 (d.b.) | %d.s. of filtrate | Final D.E. |
|---|---|---|---|---|
| (3) | 60° | 0.003 | 25.8 | 16.6 |
| (4) | 60° | 0.002 | 26.4 | 9.2 |
| (5) | 60° | 0.003 | 26.7 | 11.0 |
| (6) | 60° | 0.004 | 26.5 | 13.4 |
| (7) | 80° | 0.003 | 26.3 | 10.9 |
| (8) | 80° | 0.004 | 27.1 | 12.3 |
| (9) | 80° | 0.005 | 26.4 | 12.4 |
| (10) | 80° | 0.005 | 27.5 | 8.9 |
| (11) | 80° | 0.007 | 27.4 | 10.4 |
| (12) | 80° | 0.009 | 26.9 | 12.0 |
| (13) | 60° | 0.001 | 25.7 | 14.5 (16 hrs.) |

Each of the samples has good filtration characteristics.

Samples with a final D.E. close to 11 [samples (5), (7), (11) and (13)] are selected for refining. They are each treated with 2% Darco S-51 activated carbon and filtered through filter pads having a D-O porosity rating. Then they are evaporated to about 65% d.s. syrups. The characteristics of the syrups are reported below:

Table 2

| Sample No. | Conversion Temp.°C | D.E. | Clarity |
|---|---|---|---|
| (5) | 60° | 11.0 | Clear for 19 days, and then translucent after 24 days. |
| (7) | 80° | 10.9 | Opaque solid in 3 days. |
| (11) | 80° | 10.4 | Opaque fluid in 3 days. |
| (13) | 60° | 14.5 | Clear for 60 days (also clear for 60 days at d.s. of 66.4% and 74%) |

The foregoing results reveal the importance of conducting the conversion at a temperature below about 80°C., and preferably below about 72°C.

EXAMPLE 2

This example illustrates another preferred practice for effecting the hydrolysis of various starches by an enzyme-enzyme process.

Using the procedure outlined in Example 1, 22°–23° Be slurries of white milo starch, waxy corn starch and corn starch are oxidized with different amounts of sodium hypochlorite at a temperature of about 40°C for 1 hour, after which $NaHSO_3$ is added to neutralize the chlorine present. Each oxidized starch is then liquefied with bacterial alpha-amylase (0.051 % by weight of HT-1000) at a temperature of about 90°C. to a thinning or liquefaction D.E. of about 4.5.

After a pH adjustment to about 6.5 with NaOH, the temperature of each liquefied starch sample is adjusted to 60°C and dosed with 0.03% of bacterial alpha-amylase (HT-1000), dry basis. Each sample is converted or saccharified for approximately 4 hours, and then each sample is refined by treatment with carbon, filtration and evaporation to a high solids containing syrup.

The results of these experiments are shown in the following table.

Table 3

| Substrate: | White Milo | White Milo | White Milo | White Milo | Waxy Corn | Corn |
|---|---|---|---|---|---|---|
| % Oxidant as Chlorine (d.s.b.) | 1.0 | 3.25 | 5.50 | 5.50 | 5.50 | 5.50 |
| % Dry Sub- | | | | | | |

Table 3-continued

| Substrate: | White Milo | White Milo | White Milo | White Milo | Waxy Corn | Corn |
|---|---|---|---|---|---|---|
| stance of syrup | 72.7 | 71.6 | 72.8 | 72.3 | 73.2 | 72.2 |
| Dextrose Equivalent | 16.7 | 9.5 | 18.4 | 13.4 | 13.8 | 13.7 |
| Color (X100) (40° Be') | 1.9 | 2.1 | 2.3 | 2.2 | 2.5 | 2.9 |
| Filtration rate (160°F) gals (hr/ft$^2$) | 0.9 | 0.5 | 0.9 | 0.6 | 3.8 | <0.1 |
| Chromatographic Analysis (Carbohydrate Basis) | | | | | | |
| DP1 | 0.7 | 0.1 | 1.1 | 0.6 | 0.1 | 0.3 |
| DP2 | 7.3 | 1.7 | 8.9 | 6.5 | 3.3 | 6.0 |
| DP3 | 9.4 | 2.8 | 9.6 | 10.6 | 4.6 | 10.5 |
| DP4 | 6.2 | 2.2 | 5.4 | 8.0 | 3.0 | 7.9 |
| DP5 | 8.1 | 1.7 | 7.2 | 9.3 | 1.8 | 7.8 |
| DP6 | 5.1 | 0.4 | 5.8 | 6.1 | 1.0 | 6.2 |
| DP7+ | 63.2 | 91.1 | 62.0 | 58.9 | 86.2 | 61.3 |
| Viscosity (cps) 75°F | 45,000 | +200,000 | 36,000 | 114,000 | 182,000 | — |
| Time to Haze (days)* | | | | | | |
| 40°F | >75 | >75 | >75 | >75 | >75 | >75 |
| 75°F | >75 | >75 | >75 | >75 | >75 | >75 |

*At times indicated, samples showed mold growth and were discarded.

The above data show that the hydrolysates thus produced from the oxidized starches remain haze free for longer than 75 days.

EXAMPLE 3

This example illustrates the preparation of a starch hydrolysate from oxidized corn starch in which the oxidized starch slurry is liquefied with an acid.

The oxidized corn starch Code 5592 described in Example 1 is slurried in water to provide a slurry having a density of about 20° Be.

The slurry is then partially hydrolyzed with HCl at a temperature of about 100°C. to a D.E. of about 3.8 whereby the oxidized starch slurry is substantially free of residual starch granules The acid hydrolyzed product is then dosed with bacterial alpha-amylase (HT-1000) in an amount of about 0.03% d.b., and conversion is carried out until a final D.E. of about 13 is reached.

The product analysis is set forth as follows.

| | |
|---|---|
| DP$_1$ | 0.4 |
| DP$_2$ | 2.7 |
| DP$_3$ | 3.6 |
| DP$_4$ | 4.1 |
| DP$_5$ | 6.2 |
| DP$_6$ | 83.0 |

Concentrated syrups produced from the above hydrolysates remain haze free for longer than 60 days.

CONCLUSION

The hydrolysate products of this invention may, as indicated, be concentrated to produce syrups or syrup solids by reducing the moisture content of the syrup to less than 20%, and preferably to less than about 10%. The syrup solids exhibit water solubility and are substantially haze free when placed in solution.

Hydrolysates of the present invention, whether in the form of dilute or concentrated syrups, or in the form of dry solids, are characterized by blandness of taste and low sweetness. They are non-hygroscopic, and fully soluble in water. When used in food products, they have a minimal effect upon flavor while providing bulk, stability, and lack of hygroscopicity.

The products are thus suitable for use as carriers for synthetic sweeteners, flavorers, coloring agents and essenses; spray drying adjuncts for coffee and tea extracts; bulking, bodying and dispersing agents in synthetic creams or coffee whiteners; ingredients promoting moisture retention in bread, pastry and meats; and, as components of dry soup mixes, bakery mixes, frosting mixes, spice mixes and blends, beverage powders, gravy mixes, sauce mixes and frozen dairy foods. They can also be used in the formulation of anticaking agents, tableting compounds, whipped products, protective coating agglomeration aids and the like.

While the invention has been described in connection with specific embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains and as may be applied to the essential features hereinbefore set forth, and as follows within the scope of the invention.

We claim:

1. A process for the preparation of an oxidized maltodextrin comprising treating in a first step an aqueous slurry of oxidized starch having a minimum D.S. (carboxyl) value within the range of about 0.2 to about 1.5 with an acid or an enzyme to liquefy and hydrolyze the oxidized starch to a D.E. not substantially above about 7 and to provide a liquefied hydrolysate substantially free of residual oxidized starch granules and thereafter in an enzymatic conversion step, treating the liquefied hydrolysate with a saccharifying enzyme to produce an oxidized starch hydrolysate having a D.E. not substantially above 20.

2. A process as defined in claim 1 wherein the oxidized starch is treated in the first step with an acid to liquefy the starch.

3. A process as defined in claim 1 wherein the oxidized starch is treated in the first step with a liquefying enzyme.

4. A process as defined in claim 2 wherein the liquefaction is carried out at a pH below 5.

5. A process as defined in claim 2 wherein the liquefaction is carried out at a temperature within the range of 60° to 100°C.

6. A process as defined in claim 3 wherein the enzyme is a bacterial alpha-amylase.

7. A process as defined in claim 3 wherein the liquefaction is carried out at a temperature above 80°C.

8. A process as defined in claim 3 wherein the liquefaction is carried out at a temperature within the range of 80° to 105°C. and a pH of from about 5.0 to about 9.0.

9. A process as defined in claim 1 wherein the saccharifying enzyme is derived from a bacterial alpha-amylase.

10. A process as defined in claim 1 wherein the oxidized starch is treated with the saccharifying enzyme to produce a hydrolysate having a final D.E. within the range of 8 to 20.

11. A process as defined in claim 1 wherein the temperature in the enzyme conversion step is below 85°C.

12. A process as defined in claim 11 wherein the temperature in the enzymatic conversion step is at least 60°C, and the pH is within the range of 6.0 to 8.0.

13. A process as defined in claim 1 which includes the step of concentrating the hydrolysate produced to form a syrup which has a solids content of greater than 50% by weight.

14. A process as defined in claim 3 which includes the step of heating the liquefied hydrolysate produced in the first step to a temperature in the range of from about 95° to about 180°C. to further liquefy the oxidized starch.

15. A process for the preparation of haze-free hydrolysates from oxidized starch comprising treating in a first step an aqueous slurry of oxidized starch having a minimum carboxyl value within the range of about 0.2 to about 1.5 with an acid to liquefy and hydrolyze the oxidized starch to a D.E. not substantially above 7 and to provide a liquefied hydrolysate substantially free of oxidized starch granules and thereafter in an enzymatic conversion step, treating the liquefied hydrolysate with a saccharifying enzyme to produce an oxidized starch hydrolysate having a D.E. not substantially above 20.

16. A process for the preparation of haze-free hydrolysates from oxidized starch comprising treating in a first step an aqueous slurry of oxidized starch having a minimum carboxyl value within the range of about 0.2 to about 1.5 with a liquefying enzyme to liquefy and hydrolyze the oxidized starch to a D.E. not substantially above 7 and to provide a liquefied hydrolysate substantially free of oxidized starch granules and thereafter in an enzymatic conversion step, treating the liquefied hydrolysate with a saccharifying enzyme to produce an oxidized starch hydrolysate having a D.E. not substantially above 20.

17. A process for the preparation of haze-free hydrolysates from oxidized starch comprising treating in a first step an aqueous slurry of oxidized starch having a solids content less than about 50% by weight and having a minimum carboxyl value within the range of about 0.2 to about 1.5 with an acid or an enzyme to liquefy and hydrolyze the oxidized starch to a D.E. not substantially above 7 and to provide a liquefied hydrolysate substantially free of residual oxidized starch granules, thereafter in an enzymatic conversion step, treating the liquefied hydrolysate with a saccharifying enzyme to produce an oxidized starch hydrolysate having a D.E. not substantially above 20, and concentrating the resulting starch hydrolysate to a solids content greater than 50% by weight to obtain a syrup.

* * * * *